United States Patent [19]

Economu

[11] 4,117,749
[45] Oct. 3, 1978

[54] WIRE STRIPPER

[75] Inventor: Merle A. Economu, Palmdale, Calif.

[73] Assignee: The United States of America as represented by the Administrator of the National Aeronautics and Space Administration, Washington, D.C.

[21] Appl. No.: 713,027

[22] Filed: Aug. 9, 1976

[51] Int. Cl.² .............................................. H02G 1/12
[52] U.S. Cl. ..................... 81/9.5 R; 30/90.6
[58] Field of Search ...................... 30/90.1, 90.6, 90.7, 30/90.4, 91.1, 91.2; 81/9.5 R, 9.5 B, 9.5 A, 9.51

[56] References Cited

U.S. PATENT DOCUMENTS

| | | | |
|---|---|---|---|
| 2,120,398 | 6/1938 | Edwards et al. | 30/90.6 |
| 2,400,177 | 5/1946 | Tomsick | 81/9.5 B X |
| 2,456,882 | 12/1948 | Mackey | 30/90.6 |
| 2,503,517 | 4/1950 | Sirica | 30/90.1 X |
| 3,403,441 | 10/1968 | Eubanks | 81/9.51 X |
| 3,623,384 | 11/1971 | Murphy | 81/9.5 R |
| 3,827,317 | 8/1974 | Perrino | 81/9.5 B |
| 4,026,017 | 5/1977 | Arnold | 30/90.6 |

Primary Examiner—Al Lawrence Smith
Assistant Examiner—James G. Smith
Attorney, Agent, or Firm—Monte F. Mott; John R. Manning; Paul F. McCaul

[57] ABSTRACT

An insulation stripper is described which is especially useful for shielded wire, the stripper including a first pair of jaws with blades extending substantially perpendicular to the axis of the wire, and a second pair of jaws with blades extending substantially parallel to the axis of the wire. The first pair of jaws is pressed against the wire so the blades thereof cut into the insulation, and the device is turned to form circumferential cuts in the insulation. Then the second pair of jaws is pressed against the wire so the blades thereof cut into the insulation, and the wire is moved through the device to form longitudinal cuts that permit easy removal of the insulation. Each of the blades is located within the concave face of a V-block, to center the blades on the wire and to limit the depth of blade penetration.

3 Claims, 5 Drawing Figures

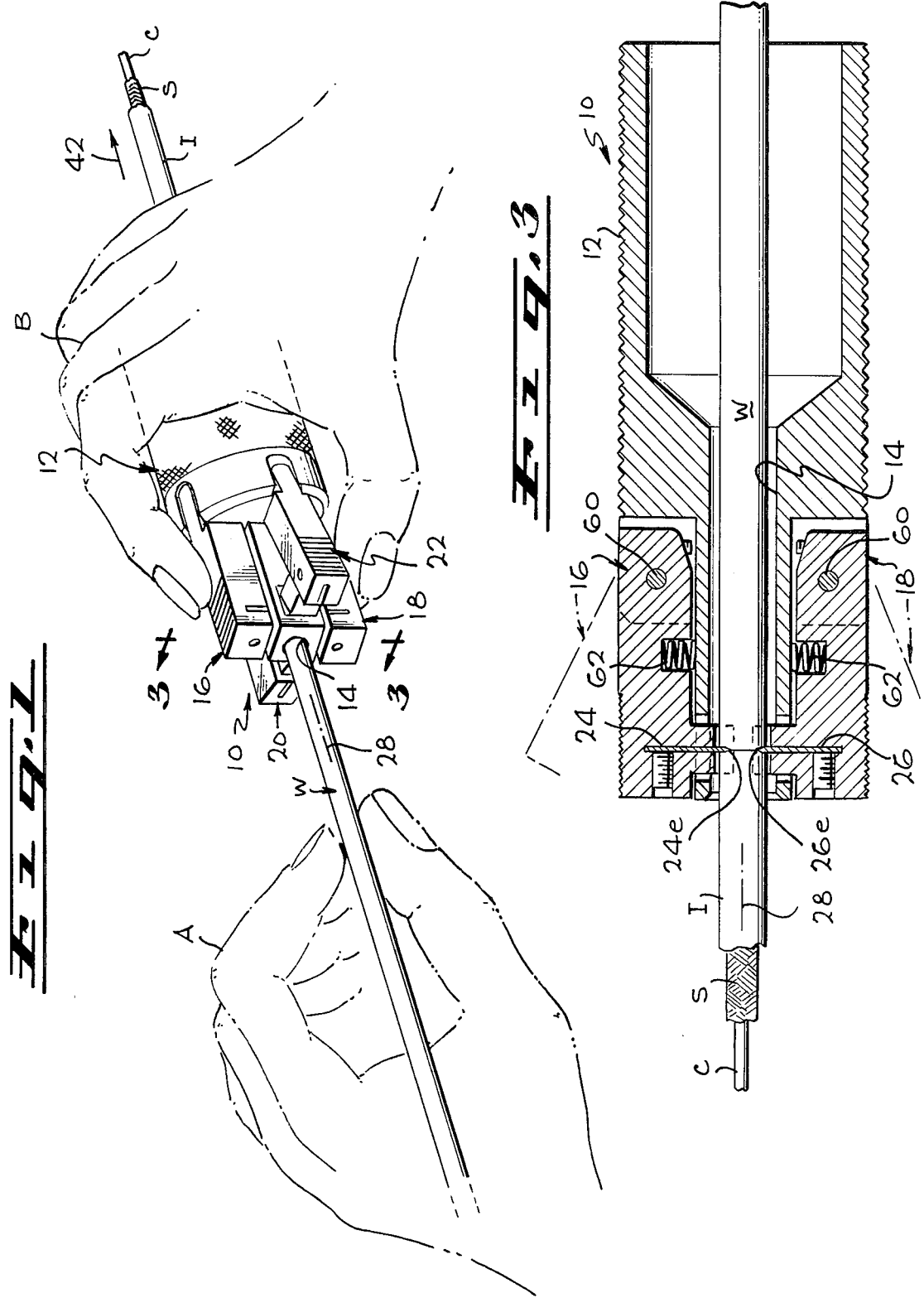

U.S. Patent  Oct. 3, 1978  Sheet 2 of 2  4,117,749
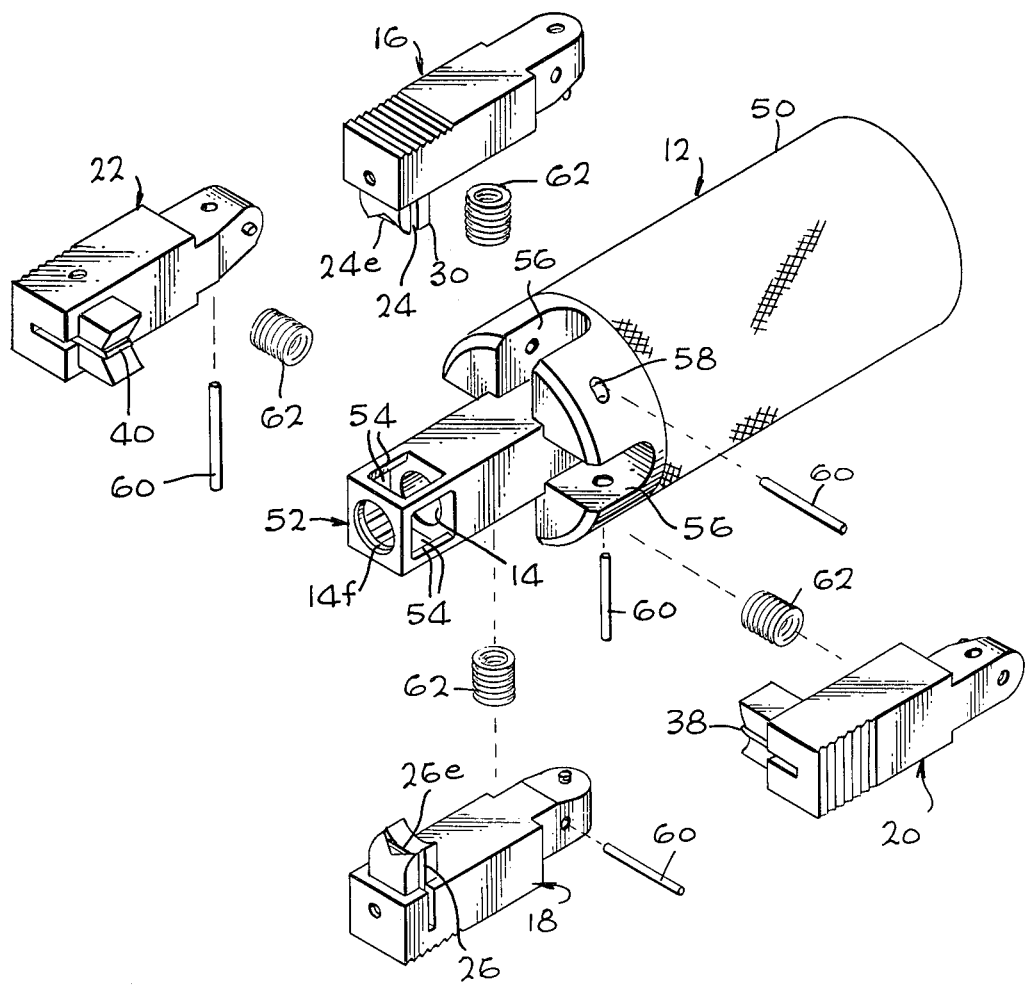

WIRE STRIPPER

ORIGIN OF INVENTION

The invention described herein was made by an employee of the U.S. Government and may be manufactured and used by and for the Government for Governmental purposes without the payment of any royalties thereon or therefor.

BACKGROUND OF THE INVENTION

This invention relates to devices for stripping insulation from wire.

Typical wire strippers utilize a pair of curved blades that are closed on the wire to cut the insulation, while a clamp or the hand of a technician pulls the wire through the closed blades. Such devices are not readily usable for shielded wires which include a shielding mesh disposed about one or more conductors and covered by insulation, inasmuch as the shielding net can be easily damaged by closed blades pulled along it. It is often necessary to prevent any damage whatsoever to the shielding net.

SUMMARY OF THE INVENTION

In accordance with one embodiment of the present invention, an insulation stripping device is provided which can remove insulation from a wire while guarding against damage to the portion of the wire that lies under the insulation, and which is especially useful for stripping shielded wire. The device includes two pairs of jaws pivotally mounted on a body to move against and away from a wire positioned between the jaws. A first pair of jaws includes a pair of blades with edges extending substantially perpendicular to the axis of the wire. Accordingly, when the first pair of jaws is impressed against opposite sides of the wire and turned, circumferential cuts are formed in the insulation. A second pair of blades have edges extending substantially parallel to the wire, so that when the second jaws move against the wire and the wire is pulled through the device, longitudinal cuts are formed in the insulation. Each blade is located within a concave block that centers the blade on the wire and that limits the depth of penetration of the blade into the wire.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of the wire stripper of the invention, showing it in use;

FIG. 2 is an exploded perspective view of the wire stripper of FIG. 1;

FIG. 3 is a sectional view taken on the line 3—3 of FIG. 1, and with a first pair of jaws shown pressed against the wire to be stripped;

FIG. 4 is a front elevation view of the wire stripper of FIG. 1; and

FIG. 5 is a partial perspective view of a wire stripper constructed in accordance with another embodiment of the invention.

DESCRIPTION OF THE PREFERRED EMBODIMENTS

As illustrated in FIG. 1, the wire stripper 10 is designed for use with a wire W, and especially a shielded wire which includes a shielding net S of metal that surrounds at least one conductor C and that is surrounded by a layer of insulation I. The wire stripping device 10 includes a body 12 with a hole 14 through which a wire is inserted. Four jaws are pivotally mounted on the body, including a first pair of jaws 16, 18 which can form circumferential cuts in the insulation of the wire, and a second pair of jaws 20, 22 that can form longitudinal cuts in the insulation. The first pair of jaws 16, 18 have blades 24, 26 (FIG. 4) with edges 24e, 26e that extend substantially perpendicular to the axis 28 of the wire and of the hole 14, or in other words, substantially perpendicular to lines that are parallel to the axis 28. The cutting edge of each blade lies in the concave face 30f, 32f of a V-block 30, 32. The second pair of jaws 20, 22 are similarly formed with V-block 34, 36 that have concave faces 34f, 36f. However, the blades 38, 40 whose edges 38e, 40e lie within the faces of the blocks 34, 36, extend substantially parallel to the axis 28 of the hole and of the wire therein.

A wire W from which insulation is to be stripped, is inserted through the hole 14 and held in one hand A (FIG. 1) while the body 12 of the device is held in the other hand B. The thumb and forefinger of the hand are placed on the first set of jaws 16, 18, and these jaws are depressed, or squeezed together, so that the first set of blades 24, 26 penetrate the insulation of the wire, as illustrated in FIG. 3. With the jaws 16, 18 depressed, the stripper device 10 is rotated back and forth with respect to the wire, to form circumferential cuts in the insulation. The wrist of a person can turn almost 90° in each direction from a central position, so that cuts extend over almost the entire circumference of the wire. The first set of jaws 16, 18 are then released. The second set of jaws 20, 22 are then squeezed together by the thumb and index finger, so that the second set of blades 38, 40 are pressed against the wire to penetrate the insulation thereof. With the second set of jaws maintained depressed, the wire stripping device 10 is moved relative to the wire W, as by pulling the stripping device in the direction of arrow 42 with respect to the wire. During such wire stripper movement, longitudinal cuts are formed in the insulation. The two pieces of insulation thus cut from the wire, can be easily removed. With the blades set at the proper depth, the wire stripper can be utilized by an unskilled person to strip insulation from a shielded wire without damaging the shielding net.

The concave faces such as 30f of the jaws, serve to center the wire on the blade edges, such as 24e, and also serve to limit the depth of penetration of the blades into the wire insulation. The blades are held by set screws 44, which can be loosened to allow repositioning of the blades for deeper cuts. It may be noted that when the concave faces of the jaws press against resilient insulation, the insulation tends to be deformed into the blades to thereby aid in cutting the insulation.

FIG. 2 illustrates details of construction of the wire stripping device. The body 12 has a cylindrical rear portion or handle end 50 which is knurled along most of its length to facilitate holding by the hand, and has a rectangular front portion or jaws end 52, the hole 14 extending through the entire length of the body. The front portion 52 of the body has four sides, and has four holes 54 through which the V-blocks of the jaws, such as block 30, can pass in order to engage the wire. The extreme front end of the body includes walls forming a hole portion 14f lying forward of the jaws. Thus, the walls of the hole 14 lies forward and rearward of the blades, to accurately position the wire. The body is also formed with cutaway regions 56, for receiving rearward ends of the jaws, and has pin-receiving holes 58 for receiving pins 60 that pivotally mount the jaws on the body. Springs 62 are also provided that resiliently urge the jaws outwardly away from the wire.

FIG. 5 illustrates a portion of a wire stripper device 70 which is useful for stripping insulation from ordinary twisted wire pairs. The stripper device 70 is the same as the device 10 described above, except that the blades 72, 74 that are oriented substantially parallel to the wire axis to form longitudinal cuts in the wire insulation, are "floating" blades instead of being rigidly fixed in position. The blade 72 is guided in movement toward and away from the wire axis by blade guide walls 76 formed in the jaw 78, and is resiliently urged towards the wire by a spring 80. The other blade 74 is similarly mounted.

Thus, the invention provides a wire stripper device of relatively simple construction, for forming accurately controlled cuts in a wire to strip the insulation therefrom. This is accomplished by providing at least one blade whose edge extends substantially perpendicular to the axis of the wire, to form a circumferential cut therein, and for providing at least one blade whose edge extends substantially parallel to the axis of the wire to form a longitudinal cut therein. Each blade lies within a block having a concave face that centers the blade on the wire and limits the depth of penetration of the blade into the wire insulation. The device is especially useful for stripping insulation from shielded wires, but can be utilized on ordinary wires, to strip insulation from the end or from a middle portion of the wire.

Although particular embodiments of the invention have been described and illustrated herein, it is recognized that modifications and variations may readily occur to those skilled in the art consequently it is intended that the claims be interpreted to cover such modifications and equivalents.

What is claimed is:

1. A wire stripper comprising:
   a body forming a wire-receiving hole extending along a predetermined axis;
   a first pair of jaws moveably mounted on said body to move toward and away from said axis, each of said first jaws having a blade with an edge that extends substantially perpendicular to said axis, said jaws positioned directly opposite one another so their blades can form part of the same circumferential cut in the wire; and
   a second pair of jaws moveably mounted on said body to move toward and away from said axis, at least one of said second jaws having a blade with an edge that extends substantially parallel to said axis, whereby a person can clamp the first jaws and pivot the body by 90° in opposite directions to form an approximately 360° circumferential cut in the insulation and then clamp the second jaws to cut the insulation longitudinally as the wire moves out of said hole.

2. The wire stipper described in claim 1 wherein: each of said jaws includes a concave face for engaging the wire and a blade with an edge lying within said concave face, whereby to maintain the position of the wire and limit the depth of the blade.

3. The wire stripper described in claim 1 wherein: the blade of at least one of said second jaws is moveably mounted on the jaw to move toward and away from said axis, and is biased towards said axis.

* * * * *